United States Patent [19]
Clatanoff et al.

[11] Patent Number: 6,124,900
[45] Date of Patent: Sep. 26, 2000

[54] RECURSIVE NOISE REDUCTION FOR PROGRESSIVE SCAN DISPLAYS

[75] Inventors: Todd A. Clatanoff, Allen; Vishal Markandey, Dallas, both of Tex.

[73] Assignee: Texas Instruments Incorporated, Dallas, Tex.

[21] Appl. No.: 09/020,326

[22] Filed: Feb. 6, 1998

[51] Int. Cl.[7] .................................................. H04N 7/00
[52] U.S. Cl. ............................................................ 348/701
[58] Field of Search ................................... 348/701, 700, 348/622, 441

[56] References Cited

U.S. PATENT DOCUMENTS

| | | | |
|---|---|---|---|
| 4,500,911 | 2/1985 | Ninomiya | 348/701 |
| 5,166,788 | 11/1992 | Lee | 348/701 |
| 5,412,436 | 5/1995 | Christopher | 348/700 |
| 5,574,512 | 11/1996 | Saeger | 348/622 |
| 5,844,617 | 12/1998 | Faroudja et al. | 348/441 |

*Primary Examiner*—Chris S. Kelley
*Assistant Examiner*—Allen Wong
*Attorney, Agent, or Firm*—Charles A. Brill; Wade James Brady, III; Frederick J. Telecky, Jr.

[57] ABSTRACT

A method and structure for producing a noise reduced video signal. The data corresponding to a pixel in a first frame is differenced with signal corresponding to that pixel in a second frame. The difference signal is then recursively noise filtered, clipped and a non-linear function is applied. The filtered and clipped difference signal is then multiplied by the difference signal and added back into the original data. The resulting data is motion adapted and noise reduced, and is used in converting from interlace to progressive scan. The method can be integrated with scaling processes as well.

13 Claims, 2 Drawing Sheets

ID SCAN DISPLAYS

RECURSIVE NOISE REDUCTION FOR PROGRESSIVE SCAN DISPLAYS

BACKGROUND OF THE INVENTION

1. Field of the Invention

This invention relates to noise reduction, more particularly to recursive noise reduction in progressive scan display systems.

2. Background of the Invention

All video sources, such as broadcast or cable TV, VCR, digital satellite, etc., contain both spatial and temporal noise. The noise can result from transmission deficiencies, skipped recording parts on tape, high frequency electrical noise, poor source reproduction, or even errors introduced by the video equipment processing the signal. Examples of these types of errors are poor chrominance and luminance separation prior to processing, repeated analog-to-digital conversion and quantization errors.

Noise created by any or all of the above can manifest itself in several ways, all of which affect the quality of the image. Examples of noise in video include horizontal streaking, busy or "snowy" areas, large impulsive changes, or color patterning. Current approaches to reducing noise typically involve comparing values from several video fields, which are sequential. This requires extra field memories, which increase the system cost. However, some systems that perform interlace to progressive scan may already have field memories.

An interlaced format has two sequential fields of video data making up one frame, while a progressive scan system receives one complete frame of data at a time. Conversion from interlace to progressive scan typically involves storing at least one field in memory. Therefore, a method allowing use of field memories in a display system for noise reduction would be beneficial, although merely adding noise reduction could slow down the system with extra program instructions.

Therefore, a method and structure are needed that allow integration of noise reduction into display systems without increasing memory costs or causing performance problems.

SUMMARY OF THE INVENTION

One aspect of the invention is a video processing architecture that allows both interlace to progressive scan conversion and recursive temporal noise reduction. The ordering of the processing tasks is changed to allow use of field memories already present in the system to also perform temporal noise reduction.

Another aspect of the invention is a method of recursive noise reduction using this architecture. Pixels from several fields are compared to reduce variations in intensity over time. The field memories are used to store a number of fields, thereby allowing the comparison. After the comparison is made, the values are filtered to eliminate the noise components. In scaling situations, the use of the recursive noise reduction method can reduce the numbers of instructions necessary.

It is an advantage of the invention in that it reduces temporal noise in video data.

It is an advantage of the invention in that it does not require extra memory in a system.

It is a further advantage of the invention in that it can reduce the number of instructions in some embodiments.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1A:
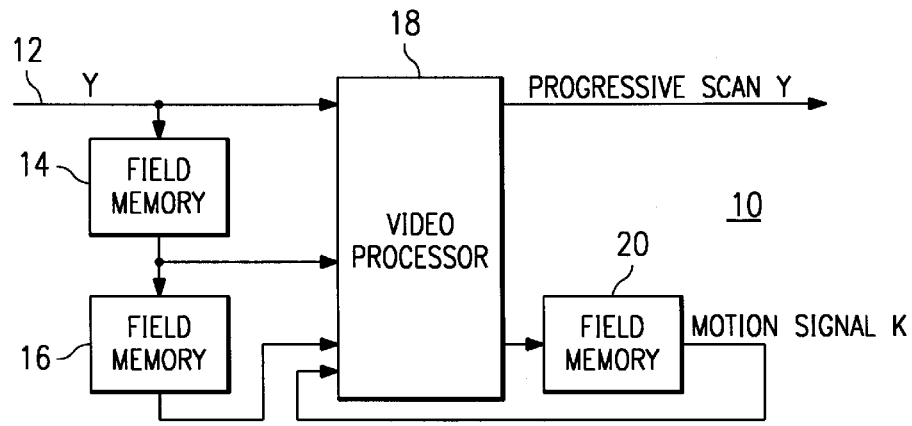
FIG. 1a is a prior art implementation of a video processing architecture.

FIG. 1a shows a prior art embodiment of a video processor and its associated memories 10 used in interlace to progressive scan. The luminance signal Y enters the processor on line 12. Line 12 is also connected to two field memories (Field Mem) 14 and 16. Field memory 16 contains a twice delayed field and field memory 14a once delayed field.

Each frame of interlace video data is divided into two fields, which arrive sequentially. For discussion purposes, the first field will be referred to as field A and the second as field B. If the incoming field on line 12 is field B from frame 1, frame memory 14 would then contain field A from frame 1 and field memory 16 would contain field B from frame 0. If the incoming field on line 12 is field A from frame 1, then field memory 14 contains field B and field memory 16 contains field A, both from the previous frame, frame 0.

These field memories are used in converting the sequential field format to a progressive scanned frame format. The video processor 18 uses the fields to determine difference values and a motion signal, k, to interpolate the data missing from a field, thereby converting it to a frame. The motion signal, k, is calculated using the video processor and the field memory 20 in well know manner. Techniques for motion signal detection and details on interlace to progressive scan conversion are beyond the scope of this discussion. However, examples can be found in U.S. Pat. No. 5,519,451, "Motion Adaptive Scan-Rate Conversion Using Directional Edge Interpolation," and U.S. patent Ser. No. 08/533,409, "Video Display with Digital De-interlacing," both of which are incorporated by reference herein.

The architecture shown in FIG. 1a has the luminance data Y and its delayed versions used by the video processor 18. The video processor could be any video processor, but in this example, the Scan-line Video Processor (SVP) manufactured by Texas Instruments, it typically used. This type of architecture does not allow for recursive filtering since the filtered Y signal has no affect on the other luminance signal inputs from the field memories 14 and 16. Therefore, this architecture cannot be used for temporal noise reduction.

Figure 2A:
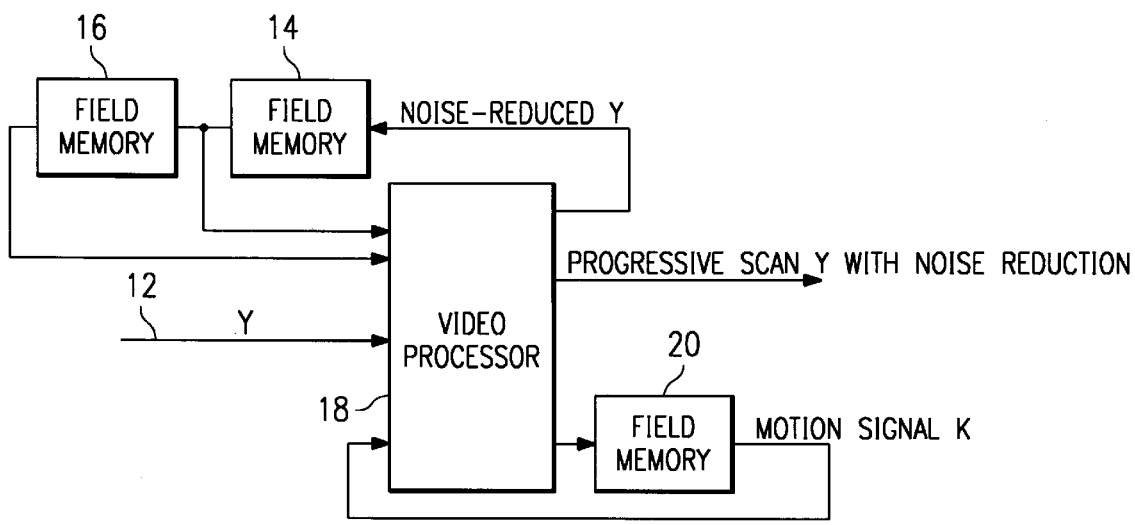
FIG. 2a is one embodiment of an architecture allowing interlace to progressive scan conversion with noise reduction.

However, an improved architecture, such as that shown in FIG. 2a, would allow luminance noise reduction without adding extra memory to the system. Furthermore, if a motion adaptive progressive scan conversion method is used, such as the one disclosed in the patent discussed above, the two methods can be integrated together. The resulting integrated method will be discussed further at FIG. 3.

Looking now at FIG. 2a, it is possible to see how the filtered Y input can affect the other luminance signals. The luminance signal Y enters the video processor 18 into on line 12. The noise reduced Y signal is then delayed into by the field memories 14 and 16 as before. Following one of the examples above, field B of frame 1 is on line 12, field memory 14 has noise reduced field A of frame 1, and field memory 16 has noise reduced field B of frame 0. These are then used to generate the progressive scan Y signal with noise reduction.

The below diagram gives a graphical look at the data being used for progressive scan conversion as well as noise reduction.

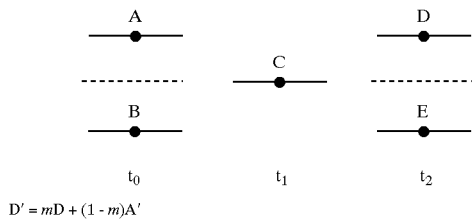

$D' = mD + (1-m)A'$

The constant m has limits of $0 \leq m \leq 1$. The noise filtering process is recursive, where the data corresponding to pixel A in the illustration above is used to generate the data corresponding to pixel D in the next frame. Pixels A and D are the same pixel in different frames. To generate pixel A, if it were in the first field at to as shown, the filter must have some kind of initial setting. In this example, the initial condition is 0. Therefore, the first filtered pixel, if that pixel were A, would be A'=mA. That value would then be used to generate D, etc. This operation would be performed on each pixel from each field.

The above noise reduction process has the further advantage of using some of the same steps as some interlace to progressive scan conversion methods used in display systems. The ability to integrate these two processes together allows noise reduction to be performed without increasing system cost. Additionally, the integration results in a reduced instruction count for a typical video processor, such as the scan-line video processor (SVP) manufactured by Texas Instruments.

Figure 3:
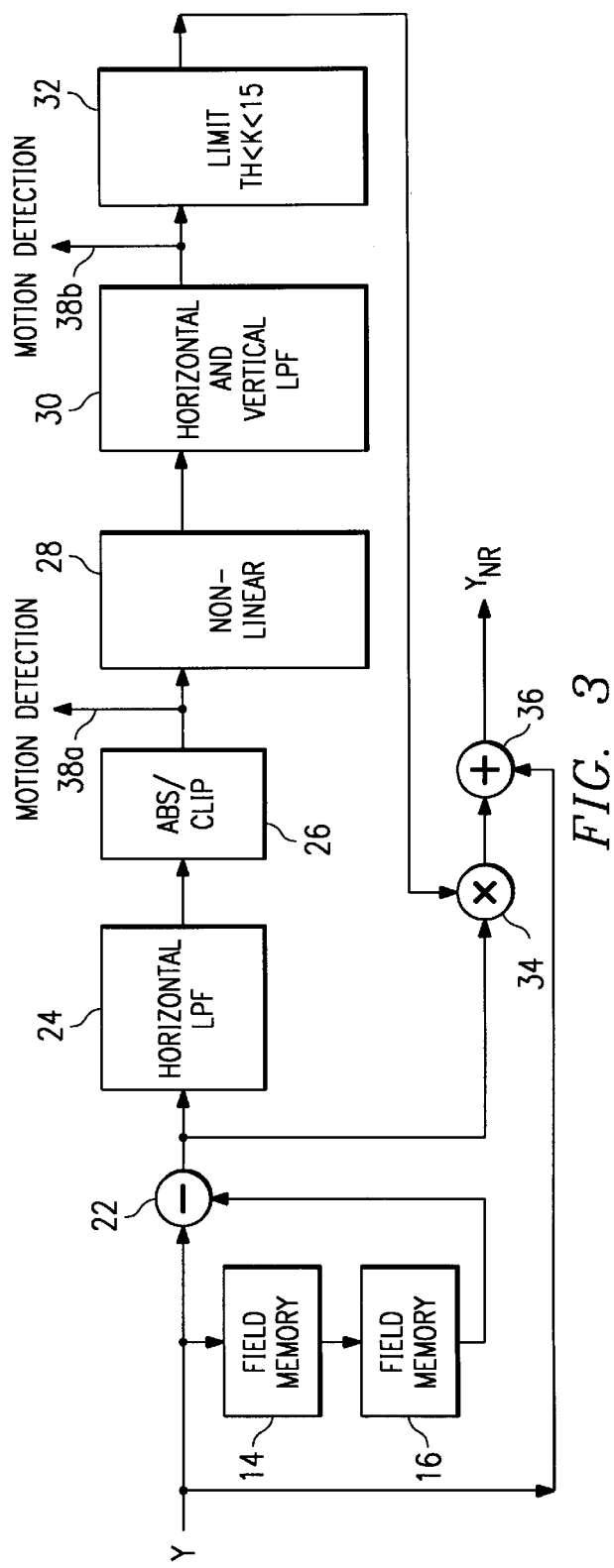
FIG. 3 is an embodiment of a process for noise reduction.

An example of the integrated temporal filtering process used to generate the noise-reduced Y or $Y_{NR}$ is shown in FIG. 3. The video processing used for both temporal noise reduction and current motion-adaptive progressive scan conversion techniques includes signal differencing across two fields, filtering and non-linear processing. By integrating the two procedures, the noise reduction can be added without incurring full processing costs that would otherwise be needed for implementation. As a result, temporal noise filtering can be added as a feature without increasing the system's hardware cost, while only adding a fraction of the required processing.

For comparison purposes only, implementation of the above process by itself would require 330 instructions on the TI SVP and 143 program words. By using the process as shown in FIG. 3, a savings of 84 instructions can be had if the values are sent for motion signal processing at point 1. If the values are sent for motion signal processing at point 2, a savings of 141 instructions can be found.

As shown in FIG. 3, the first step of the method differences the incoming field Y with previous two fields at 22 stored in memories 14 and 16. This difference signal is then horizontally filtered at 24 and then clipped to 4 bits at 26. A non-linear function is applied to the signal at 28 to reduce the noise at the low signal levels, and then the information is spread spatially at the horizontal and vertical low pass filters in 30. Arrows 38a and 38b indicate at which points the data can be sent to the processes needed to perform proscan motion detection that are not included herein. It is important to note that the resulting signal k, which is set to be between a noise threshold Th and 15 in 32 since it is a 4 bit signal, will be used with the noise reduced signal, $Y_{NR}$, to finish the conversion to proscan.

The noise reduced motion signal k is then multiplied by the frame difference signal and then added back into the original signal at 34 and 36 respectively. The resulting signal, $Y_{NR}$, is a motion adapted, noise reduced, motion adapted signal.

The proscan process uses the data from the process shown in FIG. 3, at points 38a or 38b, and $Y_{NR}$ to perform proscan conversion.

The information taken from FIG. 3 at either points 38a or 38b, as well as the noise reduced signal, $Y_{NR}$, would be used to perform progressive scan.

The above parts of the video processing are common to both temporal noise reduction and motion-adaptive progressive scan conversion. By using the same processing for both algorithms, a new video processing feature (i.e. noise reduction) can be added to the system without incurring the full processing cost needed for its implementation.

In some instances of video display, scaling may occur. This occurs most commonly when the incoming image is a different resolution than the display system. For example, an incoming signal may be of a 640 pixel per line resolution, but will be displayed on a system having a 800 pixel per line resolution. Using an integrated noise reduction technique as discussed above, a savings of 271 instruction can be had, using the TI SVP.

Figure 1B:
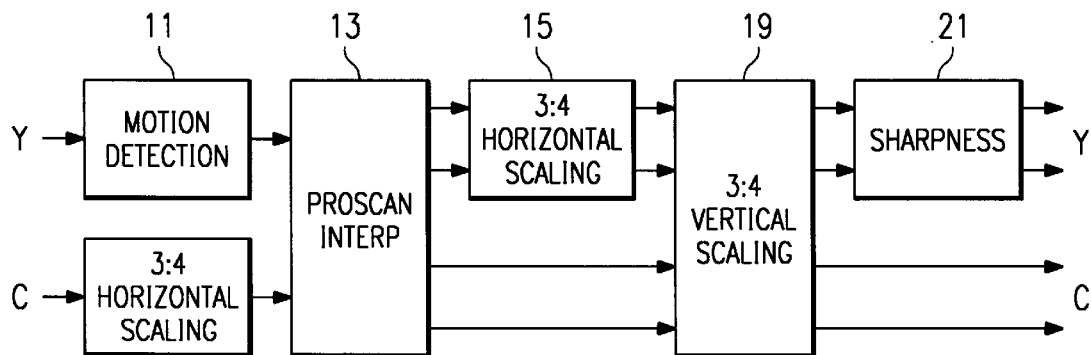
FIG. 1b is a prior art implementation of a video processing method including interlace to progressive scan conversion.
Figure 2B:
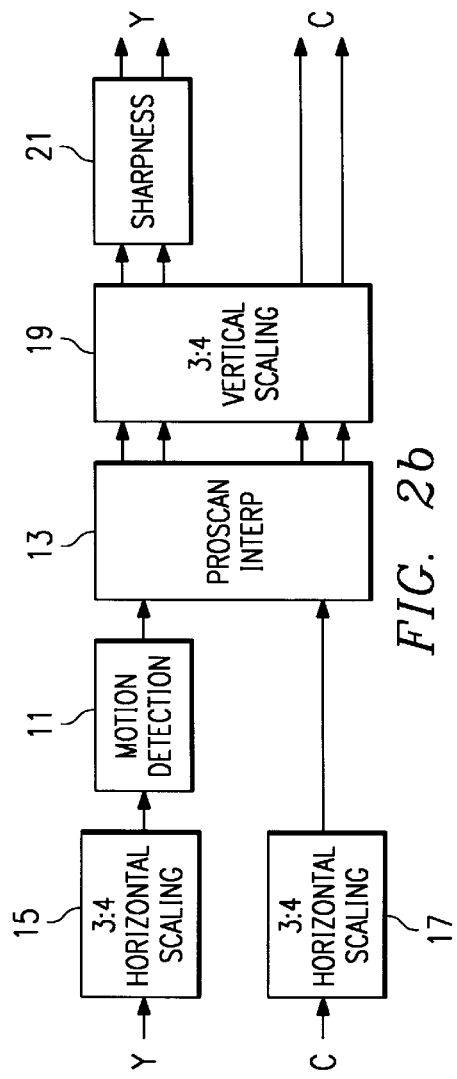
FIG. 2b is one embodiment of a process for interlace to progressive scan conversion with noise reduction.

In the prior art implementation, shown in FIG. 1b, the horizontal scaling is done on the chrominance values prior to progressive scan, and on the luminance values after progressive scan. In FIG. 2b, the horizontal scaling on the luminance values is performed prior to progressive scan, or motion detection. This can be seen by the rearrangement of the horizontal scaling module 15, the motion detection module 11 and the proscan interpolation module 13.

For comparison purposes only, a current progressive scan conversion technique uses 2316 instructions at 43 MHz and 4K words available. By performing horizontal scaling prior to progressive-scan conversion, a savings of 271 instructions could be found, for example, in a 4:5 scaling situation.

Thus, although there has been described to this point a particular embodiment for a method and structure for temporal noise reduction of video signals, it is not intended that such specific references be considered as limitations upon the scope of this invention except in-so-far as set forth in the following claims.

What is claimed is:

1. A method for integrating noise reduction and motion adaptive progressive scan comprising the steps of:
   providing a differenced signal by determining the difference between a pixel in a first frame and a pixel with a corresponding position in a second frame;
   low pass filtering on said differenced signal;
   providing a clipped difference signal by clipping the low pass filtered difference signal to a predetermined number of bits;
   providing a noise reduced signal by multiplying said differenced signal by said clipped difference signal and;

providing a motion adapted noise reduced signal for use in proscan by adding said noise reduced signal to said pixel in said first frame.

2. The method of claim 1 wherein said motion adapted noise reduced signal and said clipped difference signal are used in converting to proscan.

3. The method of claim 1 wherein said motion adapted noise reduced signal and said spread clipped difference signal are used in converting to proscan.

4. The method of claim 1 further including the step of eliminating noise in low levels from said clipped difference signal by applying a nonlinear function to said clipped difference signal.

5. The method of claim 2 further including the step of eliminating noise in low levels from said clipped difference signal by applying a nonlinear function to said clipped difference signal.

6. The method of claim 3 further including the step of eliminating noise in low levels from said clipped difference signal by applying a nonlinear function to said clipped difference signal.

7. The method of claim 1 further including the step of spreading information contained in said clipped difference signal spatially producing a spread clipped difference signal.

8. The method of claim 2 further including the step of spreading information contained in said clipped difference signal spatially producing a spread clipped difference signal.

9. The method of claim 3 further including the step of spreading information contained in said clipped difference signal spatially producing a spread clipped difference signal.

10. The method of claim 4 further including the step of spreading information contained in said clipped difference signal spatially producing a spread clipped difference signal.

11. The method of claim 5 further including the step of spreading information contained in said clipped difference signal spatially producing a spread clipped difference signal.

12. The method of claim 6 further including the step of spreading information contained in said clipped difference signal spatially producing a spread clipped difference signal.

13. A method for integrating noise reduction and motion adaptive progressive scan comprising the steps of:

providing a memory for storing each of the two successive fields comprising a plurality of pixels of a frame or successive frames of interlaced format video signals, the signals representing one of said fields being delayed the transmission time of one field relative to the other of said fields;

storing said successive fields of said video signals in said memory;

comparing each pixel in a first frame and a pixel with a corresponding position in a second frame stored in said memory and producing a differenced signal therebetween;

filtering said differenced signal;

providing a clipped difference signal by clipping said differenced signal to a predetermined number of bits;

eliminating noise in low levels by applying a nonlinear function to said clipped difference;

providing a noise reduced signal by multiplying said differenced signal by said clipped difference signal;

adding said noise reduced signal to said pixel in said first frame to provide a motion adapted noise reduced signal; and converting said noise reduced signal to proscan in conjunction with said memory.

* * * * *

UNITED STATES PATENT AND TRADEMARK OFFICE
CERTIFICATE OF CORRECTION

PATENT NO. : 6,124,900
DATED : September 26, 2000
INVENTOR(S) : Todd A. Clatanoff and Vishal Markandey It is certified that error appears in the above-identified patent and that said Letters Patent is hereby corrected as shown below:

<u>Title page,</u>
Item [60], Related U.S. Application Data,
-- Provisional Application No. 60/038,027 Feb. 14, 1997. --

Signed and Sealed this

Thirty-first Day of December, 2002

JAMES E. ROGAN
*Director of the United States Patent and Trademark Office*